(12) United States Patent
Cohen

(10) Patent No.: US 7,368,587 B2
(45) Date of Patent: May 6, 2008

(54) FUNCTIONALIZED SILOXY COMPOUND, SILICA REINFORCED RUBBER COMPOSITIONS THEREOF AND TIRE WITH COMPONENT COMPRISED THEREOF

(75) Inventor: Martin Paul Cohen, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 369 days.

(21) Appl. No.: 11/117,106

(22) Filed: Apr. 28, 2005

(65) Prior Publication Data

US 2006/0247337 A1    Nov. 2, 2006

(51) Int. Cl.
*C07F 7/08* (2006.01)
(52) U.S. Cl. .......................................... 556/427; 524/94
(58) Field of Classification Search ................. 556/427; 524/94
See application file for complete search history.

(56) References Cited

U.S. PATENT DOCUMENTS

| 4,820,751 | A | 4/1989 | Takeshita et al. ........... 523/215 |
| 6,096,832 | A | 8/2000 | Materne et al. .......... 525/332.7 |
| 6,184,306 | B1 | 2/2001 | Materne et al. .......... 525/332.7 |

OTHER PUBLICATIONS

*Low VOC Silanes for Silica Tires*, by Prashant G. Joshi as presented to the Spring 2005 167th Technical Meeting of the Rubber Division, American Chemical Society. Published May 16, 2005.

*Primary Examiner*—Peter D. Mulcahy
(74) *Attorney, Agent, or Firm*—Henry C. Young, Jr.

(57) ABSTRACT

The present invention relates to a functionalized siloxy compound which is useful in silica-filled rubber compositions and the processing of a sulfur curable rubber composition containing silica. Accordingly, the invention further relates to a rubber composition containing at least one diene-based elastomer, particulate synthetic amorphous silica (e.g. precipitated silica) and said functionalized siloxy compound as a coupling agent and to an article of manufacture (e.g. tire) containing a component comprised of such rubber composition.

20 Claims, No Drawings

FUNCTIONALIZED SILOXY COMPOUND, SILICA REINFORCED RUBBER COMPOSITIONS THEREOF AND TIRE WITH COMPONENT COMPRISED THEREOF

FIELD OF THE INVENTION

The present invention relates to a functionalized siloxy compound which is useful in silica-filled rubber compositions and the processing of a sulfur curable rubber composition containing silica. Accordingly, the invention further relates to a rubber composition containing at least one diene-based elastomer, particulate synthetic amorphous silica (e.g. precipitated silica) and said functionalized siloxy compound as a coupling agent and to an article of manufacture (e.g. tire) containing a component comprised of such rubber composition.

BACKGROUND OF THE INVENTION

Sulfur containing organosilicon compounds are useful as reactive coupling agents between rubber which contains carbon-to-carbon unsaturation and synthetic silica fillers (e.g. precipitated silica) providing for improved physical properties.

U.S. Pat. Nos. 6,096,832 and 6,184,306 disclose functionalized siloxy compounds for use in silica-filled rubber compositions as being represented by the general formula (I):

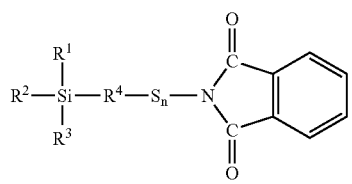

where $R^1$, $R^2$ and $R^3$ are independently selected from the group consisting of alkoxy radicals having from 1 to 8 carbon atoms; $R^4$ is selected from the group consisting of alkylene groups having from 1 to 15 carbon atoms and arylene and alkyl substituted arylene groups having from 6 to 10 carbon atoms; and n is an integer of from 1 to 8.

Functionalized siloxy compounds for use in silica filled rubber are also mentioned in U.S. Pat. No. 4,820,751.

Representative of various functionalized siloxy compounds may be, for example, siloxy compounds containing benzothiazole or thiocarbamyl moieties.

As used herein, the term or phrase "rubber or elastomer containing olefinic unsaturation" is intended to include both natural rubber and its various raw and reclaim forms as well as various synthetic rubbers. As used herein, the terms "rubber" and "elastomer" may be used interchangeably, unless otherwise prescribed. The terms "rubber composition", "compounded rubber" and "rubber compound" may be used herein interchangeably to refer to rubber which has been blended or mixed with various ingredients and materials and such terms are well known to those having skill in the rubber mixing or rubber compounding art.

The term "phr" as used herein, and according to conventional practice, refers to "parts by weight of a respective material per 100 parts by weight of rubber, or elastomer."

SUMMARY AND PRACTICE OF THE INVENTION

In accordance with this invention, a functionalized siloxy compound is provided which is comprised of the general formula (II):

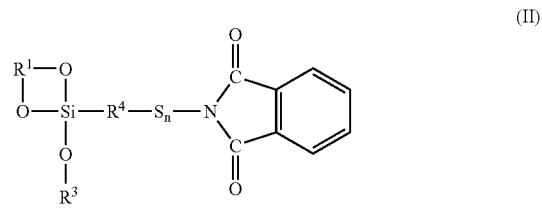

wherein $R^1$ is a divalent group selected from a divalent alkyl group of a linear or branched configuration and contains from 2 through 18, alternately from 2 to 6, carbon atoms, a divalent aryl group which contains from 6 to 18 carbon atoms or a divalent aralkyl group which contains from 7 to 18 carbon atoms, wherein $R^1$ is connected to and abridges two adjoining oxygen atoms attached to the silicon atom to thereby form a bridged structure comprised of said $R^1$ divalent group, said two oxygen atoms and said silica atom; wherein $R^4$ is selected from an alkylene group having from 1 through 15 carbon atoms, an arylene group containing from 6 to 10 carbon atoms or an alkyl substituted arylene group containing from 7 to 10 carbon atoms, preferably an alkylene group having from 1 through 6 carbon atoms; and n is a value of from 1 to 8, preferably 1; and wherein $R^3$ is:

(A) an alkyl group containing from 2 to 18 carbon atoms, aryl group containing from 6 to 18 carbon atoms or aralkyl group containing from 7 to 18 carbon atoms, and/or (B) a divalent group selected from a divalent alkyl group containing from 2 to 18 carbon atoms, a divalent aryl group containing from 6 to 18 carbon atoms, or a divalent aralkyl group containing from 7 to 18 carbon atoms, wherein said $R^3$ divalent group is bonded to another functionalized siloxy compound of the general formula (II) in the manner of the general formula (III):

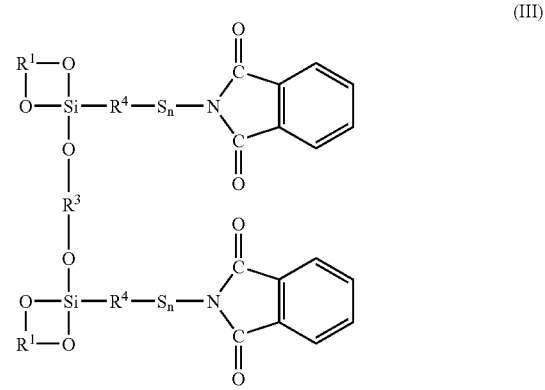

In practice, said $R^1$ divalent group may contain an additional moiety composed of one or more of sulfur, nitrogen or oxygen atoms within or pendent to the said $R^1$ linear or branched divalent group which may be a sulfur, nitrogen or oxygen atom or group which contains sulfur, nitrogen or oxygen. In this manner, then, said functionalized siloxy compound may contain an additional functionalization and thereby be in a form of an additionally functionalized siloxy compound.

In practice, the $S_n$—N bond breaks at an elevated temperature to yield a free sulfur radical which can bond to carbon-to-carbon double bond unsaturation in a diene-based elastomer in a rubber composition. The alkoxy moieties can readily react, either directly or subsequent to hydrolysis by available water (e.g. moisture) within the silica containing rubber composition, with hydroxyl groups (e.g. silanol groups) contained on the synthetic amorphous silica (e.g. precipitated silica) in the silica containing rubber composition to thereby couple the silica to the diene-based elastomer.

Such functionalized alkoxy compound can be prepared, for example, by reaction of the appropriately functionalized organosilane sulfenyl chloride with a phthalimide alkalli metal salt.

In further accordance with this invention, a rubber composition is provided which is comprised of a rubber composition comprised of at least one elastomer containing olefinic unsaturation, synthetic amorphous silica (e.g. precipitated silica) containing hydroxyl groups (e.g. silanol groups) on its surface and said functionalized siloxy compound of said general formulas (II) and (III) which may optionally additionally contain the functionalized siloxy compound of the general formula (I).

In practice, it is envisioned that the functionalized siloxy compounds of the general formulas (II) and (III) and their use as silica coupling agents are a departure from and an improvement over past practice of use of siloxy containing polysulfide compounds as coupling agents which rely upon a plurality of ethoxy-based alkoxy groups which, upon reaction with hydroxyl groups on a synthetic silica (e.g. precipitated silica aggregates) in turn generate a considerable amount of relatively volatile low molecular weight alcohol byproducts (e.g. ethanol from ethoxy radicals).

In additional accordance with this invention, a rubber composition is provided comprised of, based upon parts by weight per 100 parts by weight diene-based elastomer (phr):

(A) 100 parts by weight of at least one sulfur vulcanizable elastomer selected from conjugated diene homopolymers and copolymers and from copolymers of styrene and at least one conjugated diene;

(B) about 10 to about 150 phr of particulate reinforcing filler comprised of:
  (1) about 10 to about 150, alternately from about 20 to about 90, phr of synthetic amorphous silica (e.g. precipitated silica) containing hydroxyl groups (e.g. silanol groups) on its surface, and
  (2) from zero to about 50, alternately from about 3 to about 40, phr of rubber reinforcing carbon black, and (C) said functionalized alkoxy compound of said general formula (II) or said general formula (III) as a coupling agent for said synthetic amorphous silica.

The said functionalized siloxy compounds might, in one sense, be classified as, for example, alkoxy dioxoalkylene silylalkyl-phthalimide-sulfides and alkoxy dioxoalkylene silylaryl-phthalimide-sulfides. Representative examples include, for example, ethoxy dioxolanyl ($R^1$=—$CH_2$—$CH_2$—) silylpropyl-phthalimide-monosuolfide, ethoxy dioxanyl ($R^1$=—$CH_2$—$CH_2$—$CH_2$—) silylpropyl-phthalimide-monosuolfide, ethoxy dioxolanyl ($R^1$=—$CH_2$—$CH_2$—) silylpropyl-phthalimide-disulfide, ethoxy-(1,3-dioxo-2-methylpropylene)-silylpropyl-phthalimide-monosulfide, ethoxy dioxolanyl ($R^1$=—$CH_2$—$CH_2$—) silylpropyl-phthalimide-tetrasulfide, ethoxy dioxolanyl ($R^1$=—$CH_2$—$CH_2$—) silylpropyl-phthalimide-hexasulfide and ethoxy dioxolanyl ($R^1$=—$CH_2$—$CH_2$—) silylpropyl-phthalimide-octasulfide.

The said functionalized siloxy compounds used in the present invention may be added to the rubber by any conventional technique such as on a mill or in an internal rubber mixer. The amount of the asymmetrical siloxy compound may vary widely depending on the type of rubber and other compounds present in the vulcanizable composition. Generally, the amount of the siloxy compound may be used, for example, in a range of from about 0.05 to about 15.0 phr with a range of 0.1 to about 8.0 phr being preferred. The siloxy compound is preferably added in a nonproductive mixing stage with or subsequent to the silica.

For ease in handling, the said functionalized siloxy compound may be used per se or may be deposited on a suitable particulate carrier. Examples of such carriers are, for example, silica, carbon black, alumina, alumina silicates, clay, kieselguhr, cellulose, silica gel and calcium silicate.

Representative examples of various conjugated diene-based elastomers for use in this invention include, for example and not intended to limiting, are comprised of cis 1,4-polyisoprene rubber (natural and synthetic), cis 1,4-polybutadiene rubber, styrene/butadiene copolymer rubber (solution and aqueous emulsion polymerization prepared), styrene/isoprene/butadiene terpolymer rubber, isoprene/butadiene copolymer rubber, high vinyl polybutadiene rubber having a vinyl 1,2-content of from about 40 to about 85 percent and a nitrile/butadiene rubber.

The rubber composition should contain a sufficient amount of synthetic amorphous silica, and rubber reinforcing carbon black, if used, to contribute a reasonably high modulus and high resistance to tear to the cured rubber composition.

The siliceous pigments (synthetic amorphous silica) preferably employed in this invention are precipitated silicas such as, for example, those obtained by the acidification of a soluble silicate, e.g., sodium silicate.

Such silicas might be characterized, for example, by having a BET surface area, as measured using nitrogen gas, for example, in a range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized, for example, by having a dibutylphthalate (DBP) absorption value in a range of about 100 to about 400, and more usually about 150 to about 300, cc/100 g.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR; and silicas available from Degussa AG with, for example, designations VN2, VN3, BV3380GR, etc; and silicas available from Huber, for example Huber Sil 8745.

The said functionalized siloxy compounds function as silica coupling agents. They may be used alone and/or in combination with additional sulfur containing organosilicon compounds. Examples of suitable sulfur containing organosilicon compounds are of the formula:

$$Z\text{-Alk-}S_n\text{-Alk-}Z \qquad \text{II}$$

in which Z is selected from the group consisting of

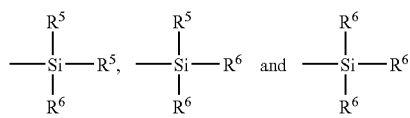

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; and alk is a divalent hydrocarbon of 1 to 18 carbon atoms and n is an integer of 2 to 8.

Exemplary of such additional sulfur containing organosilicon compounds are for example, bis(3-trialkoxysilylalkyl) polysulfides having an average of from 2 to 4 connecting sulfur atoms in its polysulfidic bridge. For example it may be a bis(3-triethoxysilylpropyl) polysulfide. It may contain an average of from 2 to 2.6 or an average of from 3.4 to 4 connecting sulfur atoms in its polysulfidic bridge.

Preferably Z is

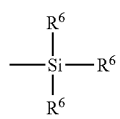

where $R^6$ is an alkoxy of 2 to 4 carbon atoms, with 2 carbon atoms being particularly preferred.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid, comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica, compound of Formula I and carbon black, if used, are mixed in one or more non-productive mix stages. The terms "non-productive" and "productive" mix stages are well known to those having skill in the rubber mixing art. The sulfur vulcanizable rubber composition containing the compound of Formula I, vulcanizable rubber and generally at least part of the silica should, as well as the sulfur-containing organosilicon compound of Formula II, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

In such manner, then the said functionalized siloxy compound could be utilized for reaction with the silica and sulfur vulcanizable elastomer and the independent addition of the sulfur donor, particularly a free sulfur source, could be primarily relied upon for the vulcanization of the elastomer.

In accordance with another embodiment, the said functionalized siloxy compound is optionally added to the thermomechanical preparatory mixing in a form of a particulate comprised of:

(A) about 25 to about 75, preferably about 40 to about 60, weight percent of said functionalized siloxy compound and, correspondingly, (B) about 75 to about 25, preferably about 60 to about 40, weight percent particulate carbon black.

One advantage of this embodiment is providing the said functionalized siloxy compound in a form of a particulate so as to add the functionalized siloxy compound in a form of a relatively dry, or substantially dry, powder in which the carbon black acts as a carrier for the asymmetrical siloxy compound since it is considered herein that the asymmetrical siloxy compound may be liquid, or substantially liquid. A contemplated benefit for the particulate is to aid in the dispersing of the functionalized siloxy compound in the preparatory mixing step(s) of the process of this invention and to aid in the introduction of the functionalized siloxy compound into the preparatory mixing of the rubber composition mixture.

Accordingly, the invention also thereby contemplates a vulcanized rubber composition prepared by such process.

Accordingly, the invention also thereby contemplates a vulcanized tire prepared by such process.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A functionalized siloxy compound comprised of the general formula (II):

(II)

wherein $R^1$ is a divalent group selected from a divalent alkyl group of a linear or branched configuration and contains from 2 through 6 carbon atoms, divalent aryl group which contains from 6 to 18 carbon atoms or divalent aralkyl group which contains from 7 to 18 carbon atoms, wherein $R^1$ is connected to and abridges two adjoining oxygen atoms attached to the silicon atom to thereby form a bridged structure comprised of said $R^1$ divalent group, said two oxygen atoms and said silica atom; wherein $R^4$ is selected from an alkylene group having from 1 through 15 carbon atoms, arylene group having from 6 to 10 carbon atoms or alkyl substituted arylene group having from 7 to 18 carbon atoms; and n is a value of from 1 to 8, and wherein $R^3$ is:

(A) an alkyl group containing from 2 to 18 carbon atoms, aryl group containing from 6 to 18 carbon atoms or aralkyl group containing from 7 to 18 carbon atoms, and/or (B) a divalent group selected from a divalent alkyl group containing from 2 to 18 carbon atoms, a divalent aryl group containing from 6 to 18 carbon atoms or aralkyl group containing from 7 to 18 carbon atoms, wherein said $R^3$ divalent group is bonded to another functionalized siloxy compound of the general formula (II) in the manner of the general formula (III):

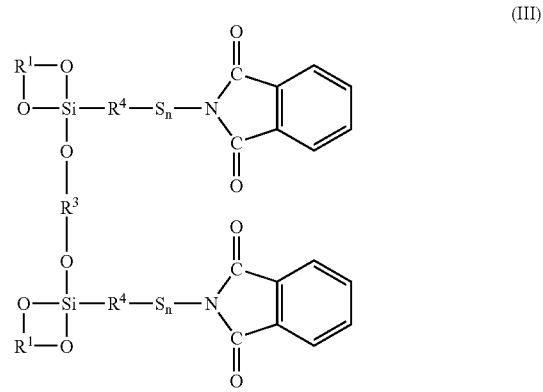

2. The functionalized alkoxysilane compound of claim 1 wherein said $R^1$ divalent group contains an additional moiety composed of one or more of sulfur, nitrogen or oxygen atoms within or pendent to the said $R^1$ linear or branched divalent group.

3. The functionalized alkoxysilane compound of claim 1 wherein said $R^1$ divalent group contains an additional moiety composed of one or more of sulfur, nitrogen or oxygen atoms within or pendent to the said $R^1$ linear or branched divalent group wherein said additional moiety is a group which contains sulfur, nitrogen or oxygen.

4. The functionalized alkoxysilane compound of claim 1 wherein said $R^3$ is an alkyl group.

5. The functionalized alkoxysilane compound of claim 1 wherein said $R^3$ is an ethyl group.

6. The functionalized alkoxysilane compound of claim 1 wherein said $R^3$ is a divalent group.

7. The functionalized alkoxysilane compound of claim 1 wherein said $R^4$ is an alkylene group and n is 1.

8. The functionalized alkoxysilane compound of claim 5 wherein said $R^4$ is an alkylene group and n is 1.

9. The functionalized alkoxysilane compound of claim 6 wherein said $R^4$ is an alkylene group and n is 1.

10. The functionalized alkoxysilane compound of claim 1 comprised of a mixture of the functionalized alkoxysilane compound of the general formula (II) and of the functionalized alkoxysilane compound of the general formula (III).

11. The functionalized alkoxysilane compound of claim 10 wherein said mixture of functionalized alkoxysilane compounds further contains an alkoxysilane compound of the general formula (I):

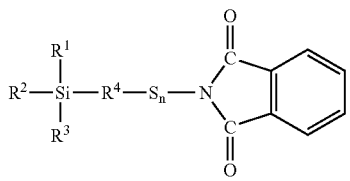

(I)

where $R^1$, $R^2$ and $R^3$ are independently selected from the group consisting of alkoxy radicals having from 1 to 8 carbon atoms; $R^4$ is selected from the group consisting of alkylene groups having from 1 to 15 carbon atoms and arylene and alkyl substituted arylene groups having from 6 to 10 carbon atoms; and n is an integer of from 1 to 8.

12. The functionalized alkoxysilane compound of claim 10 wherein said $R^4$ is an alkylene group and n is 1.

13. A rubber composition comprised of, based upon parts by weight per 100 parts by weight diene-based elastomer (phr):
    (A) 100 parts by weight of at least one sulfur vulcanizable elastomer selected from conjugated diene homopolymers and copolymers and from copolymers of styrene and at least one conjugated diene;
    (B) about 10 to about 150 phr of particulate reinforcing filler comprised of:
        (1) about 10 to about 150 phr of synthetic amorphous silica containing hydroxyl groups on its surface, and
        (2) from zero to about 50 phr of rubber reinforcing carbon black, and
    (C) said functionalized alkoxy compound of claim 1.

14. The rubber composition of claim 13 wherein said synthetic amorphous silica is a precipitated silica.

15. A rubber composition comprised of, based upon parts by weight per 100 parts by weight diene-based elastomer (phr):
    (A) 100 parts by weight of at least one sulfur vulcanizable elastomer selected from conjugated diene homopolymers and copolymers and from copolymers of styrene and at least one conjugated diene;
    (B) about 10 to about 150 phr of particulate reinforcing filler comprised of:
        (1) about 10 to about 150 phr of precipitated silica containing hydroxyl groups on its surface, and
        (2) from zero to about 50 phr of rubber reinforcing carbon black, and
    (C) said functionalized alkoxy compound of claim 2.

16. A rubber composition comprised of, based upon parts by weight per 100 parts by weight diene-based elastomer (phr):
    (A) 100 parts by weight of at least one sulfur vulcanizable elastomer selected from conjugated diene homopolymers and copolymers and from copolymers of styrene and at least one conjugated diene;
    (B) about 10 to about 150 phr of particulate reinforcing filler comprised of:
        (1) about 10 to about 150 phr of precipitated silica containing hydroxyl groups on its surface, and
        (2) from zero to about 50 phr of rubber reinforcing carbon black, and
    (C) said functionalized alkoxy compound of claim 10.

17. A tire having a component of a rubber composition comprised of the rubber composition of claim 13.

18. A tire having a component of a rubber composition comprised of the rubber composition of claim 16.

19. A tire having a tread of a rubber composition comprised of the rubber composition of claim 13.

20. A tire having a tread of a rubber composition comprised of the rubber composition of claim 16.

* * * * *